United States Patent
Yamamoto et al.

(10) Patent No.: US 6,396,648 B1
(45) Date of Patent: May 28, 2002

(54) IMAGE READER WHICH CAN SHORTEN FOCAL LENGTH IN OPTICAL SYSTEM HAVING OPTICAL LENS WHILE KEEPING PREDETERMINED IMAGE READING WIDTH

(75) Inventors: Tetsuichiro Yamamoto; Shinya Kubo, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/528,100

(22) Filed: Mar. 17, 2000

(30) Foreign Application Priority Data

Mar. 30, 1999 (JP) .............................. 11-090180

(51) Int. Cl.[7] .......................... G02B 27/02; H01L 27/00
(52) U.S. Cl. ...................... 359/806; 359/668; 359/776; 359/785; 250/208.1; 250/227.11; 358/475; 362/297
(58) Field of Search ................................. 359/806, 663, 359/668, 785, 776, 778, 775, 740, 760, 764; 250/208.1, 205, 234, 227.11; 358/475, 483, 494; 362/297, 31

(56) References Cited

U.S. PATENT DOCUMENTS

| 5,847,884 A | * 12/1998 | Kamon et al. ............... 359/806 |
| 6,049,433 A | * 4/2000 | Tsai ........................... 359/668 |
| 6,232,592 B1 | * 5/2001 | Sugiyama .............. 250/227.11 |

\* cited by examiner

Primary Examiner—Loha Ben
(74) Attorney, Agent, or Firm—Whitham, Curtis Christofferson, PC

(57) ABSTRACT

An image reader including a light source irradiating light to a reading object, a reading device reading an image on the reading object based on the radiated light; and a lens focusing the image onto the reading device and having a characteristic by which a distortion rate is increased from the central part to the end part. The distortion rate of the end part is set to a value in which there is no need to complement the read image.

20 Claims, 3 Drawing Sheets

IMAGE READER WHICH CAN SHORTEN FOCAL LENGTH IN OPTICAL SYSTEM HAVING OPTICAL LENS WHILE KEEPING PREDETERMINED IMAGE READING WIDTH

BACKGROUND OF THE INVENTION

1. Field of the Invention

The present invention relates to an image reader having an optical system including an optical lens.

2. Description of the Related Art

An image reader is used when a printed image is read. The image reader is, for example, a scanner. The image reader is provided with a light source, an optical system including an optical lens and a reading device. A read image is formed on the reading device through the optical system. The reading device converts the read image into an electric signal.

FIG. 1 shows a main part of an image reader of prior art. In FIG. 1, a symbol 1 denotes a light source. 2 denotes a reading device. 3 denotes an optical lens. And, S denotes a reading target (a printed image).

The light source 1 is arranged on a reading side of the reading target S. The light source 1 is arranged on a rear side of the reading target S. The light source 1 emits a light onto the reading target S. The reading device 2 is arranged on a front side of the reading target S. A printed image is formed on a surface of the reading target S. The light from the light source 1 generates a shadow of the printed image. The reading device 2 scans the surface of the reading target S. The reading device 2 reads the image formed on the surface of the reading target S based on the shadow. The optical lens 3 is mounted between the reading target S and the reading device 2. The optical lens 3 forms the image on an image forming surface 2a of the reading device 2. The reading device has a resolution characteristic of, for example 600 dpi. A focal length L1 of the optical lens 3 is set for a normal width W1. The focal length L1 is, for example 300 mm. A read image inputted to the reading device 2 is converted into an electric signal. The electric signal is transmitted to an image processor (not shown). The image processor re-constitutes an image, in which distortion is small, in accordance with the electric signal.

Configuration in which a wide-angle lens is used as the optical lens is well known in order to expand a reading width. FIG. 2 shows a main part of an image reader of prior art in which the wide-angle lens is used. As shown in FIG. 2, an optical system having a wide-angle lens 3' to expand the reading width from the normal width W1 to a wide width W2. The wide width W2 having additional width A1 and A2. A focal length L2 of the wide-angle lens 3' is the same as the focal length L1. The wide-angle lens 3' forms an image, in which the distortion is small, for the normal width W1. The wide-angle lens 3' forms an image in which the distortion is large, for the additional width A1 and A2. In the read image for the additional width A1 and A2, a part thereof is dropped. The drop of the read image is brought about because of the distortion. In the illustrated image reader, a later stage process is carried out for complementing the dropped image. The later stage process implies a process for complementing the dropped image with a pseudo information.

The reading devices 2 of the image reader shown in FIG. 1 and FIG. 2 are provided with a color CCD an imaging device.

FIG. 3 shows a prior art in which a color CCD is used as an imaging device. In the color CCD shown in FIG. 3, three colors of a R (Red) line, a G (Green) line and a B (Blue) line are arranged in a sub-scanning direction. An interval N (N line interval) is set for the arrangement. This arrangement generates an action for suppressing a distortion rate of the optical lens. Line memories corresponding to at least 2×N lines are installed in the image reader in order to mix the colors.

In the reading device 2 shown in FIG. 1, if a focal length of the optical system is set to be shorter than a predetermined length (L1,L2), the image forming performance of the reading device 2 is reduced. Miniaturization of the image reader depends on the focal length. In the image reader shown in FIG. 1, it is difficult to simultaneously reserve the image forming performance and miniaturize the image reader (shorten the focal length).

The type of the image reader is not limited to the type in which a small type optical system is used. A contact type image sensor is used in another type image reader. Another type image reader is slower in a reading speed than the image reader using the small type optical system. Another type image reader can not establish a deep focal length. Another type image reader has an expensive price. In another type image reader having such conditions, its usage is limited.

A conventional technology concerning a field of the invention has been disclosed in Japanese Patent Laid-open JP-A S64-86664, JP-A H5-176323, JP-A H5-260248, JP-A H8-9109 and JP-A H9-261523.

Market of an image reader requests an image reader which can read an image at a high speed and has a cheap price. The image reader which can read the image at the high speed and has the cheap price can be attained by an image reader using an optical system including a CCD camera. However, it is difficult to miniaturize this image reader.

SUMMARY OF THE INVENTION

Therefore, an object of the present invention is to provide an image reader in which an optical system is small, a reading speed is fast and its manufacturing cost is cheap.

In order to achieve an aspect of the present invention, an image reader according to the invention includes a light source, a reading device and a lens. The light source irradiates light to a reading object. The reading device reads an image on the reading object based on reflected light from the reading object. The lens focuses the image onto the reading device and has an optical characteristic of which a distortion rate is increased from the central part to the end part of the lens. The distortion rate of the end part is set to a value in which a correction of the read image is not needed.

In the above image reader, the lens is provided by a wide-angle lens or a fish-eye lens.

In the above image reader, the light source is arranged in a rear side of the reading object;

In the above image reader, the reading device is arranged in a front the of the reading object. Furthermore, the lens is arranged between the reading object and the reading device such that the image of the reading device is focused on the reading device.

In the above image reader, the light source and the reading device are arranged in a front side of the reading object. Furthermore, the lens is arranged between the reading object and the reading device such that the image of the reading device is focused on the reading device.

In the above image reader, wherein a resolution for the end part is set to 200 dpi and more. Furthermore, a resolution for the central part is set to 300 dpi and more.

In the above image reader, the reading device includes a line memory which stores an image data of the read image.

In the above image reader, the reading device comprises a CCD which can generate, a signal based on the read image.

In the above image reader, a mirror arranged on a light path between the reading object and the lens and reflecting the reflected light or a transmitted light from the reading object to the lens.

In the above image reader, focus length of the lens is set such that a distance between the reading object and the reading device is set to from 30 mm to 250 mm.

In the above image reader, resolution of the reading device is set to 200 dpi and more.

In order to achieve an aspect of the present invention, a method of image reading includes an irradiation and a focusing. By the irradiation, a light from a light source is irradiated to the reading object. By the focusing, an image on the reading object to the reading device a lens of which a distortion rate increases from the center part to the end part of the lens.

In the above method, the lens is provided by a wide-angle lens or a fish-eye lens.

In the above method, the light source is arranged in a rear side of the reading object.

In the above method, the reading device is arranged in a front the of the reading object. Furthermore, the lens is arranged between the reading object and the reading device such that the image of the reading device is focused on the reading device.

In the above method, the light source and the reading device are arranged in a front side of the reading object. Furthermore, the lens is arranged between the reading object and the reading device such that the image of the reading device is focused on the reading device.

In the above method, wherein a resolution for the end part is set to 200 dpi and more. Furthermore, a resolution for the central part is set to 300 dpi and more.

In the above method, the reading device includes a line memory which stores an image data of the read image.

In the above method, the reading device comprises a CCD which can generates a signal based on the read image.

In the above method, a mirror arranged on a light path between the reading object and the lens and reflecting the reflected light or a transmitted light from the reading object to the lens.

In the above method, focus length of the lens is set such that a distance between the reading object and the reading device is set to from 30 mm to 250 mm. In the above image reader, resolution of the reading device is set to 200 dpi and more.

An optical lens is arranged between a reading device and a surface of a reading target. In the optical lens, a distortion rate (a curvature radius) of an end part is set to be higher than that of a central part (the curvature radius is small). A resolution of the central part is set to be higher in order to keep an image quality (resolution) of the end part, even if the distortion rate of the end part becomes larger. If the resolution of the central part is set to be higher, the resolution of the end part having the distortion rate larger than that of the central part is maintained in a condition that information is never dropped.

In this image reader, the distortion rate of the end part in the optical lens is set to be larger. This distortion rate expands an effective reading width of an image. If this optical lens is used, it is possible to reserve the effective reading width equal to that of the conventional image reader, even if the length of the optical path is made shorter. In the image reader, the device can be miniaturized.

In this image reader, the resolution of the central part in the optical lens is set to be higher. This resolution avoids the information from being dropped in the end part having the larger distortion rate. The avoidance of the drop of the information enables the reading performance to be kept constant.

In this image reader, a reflection mirror is mounted to accordingly curve and turn the optical path. Since the optical path is curved and turned, the arrangement of the reading device can be changed. It is possible to shorten a distance between the reading target and the reading device while keeping the whole length of the optical path. This results in the miniaturization of the device.

DESCRIPTION OF THE PREFERRED EMBODIMENTS

Figure 4:
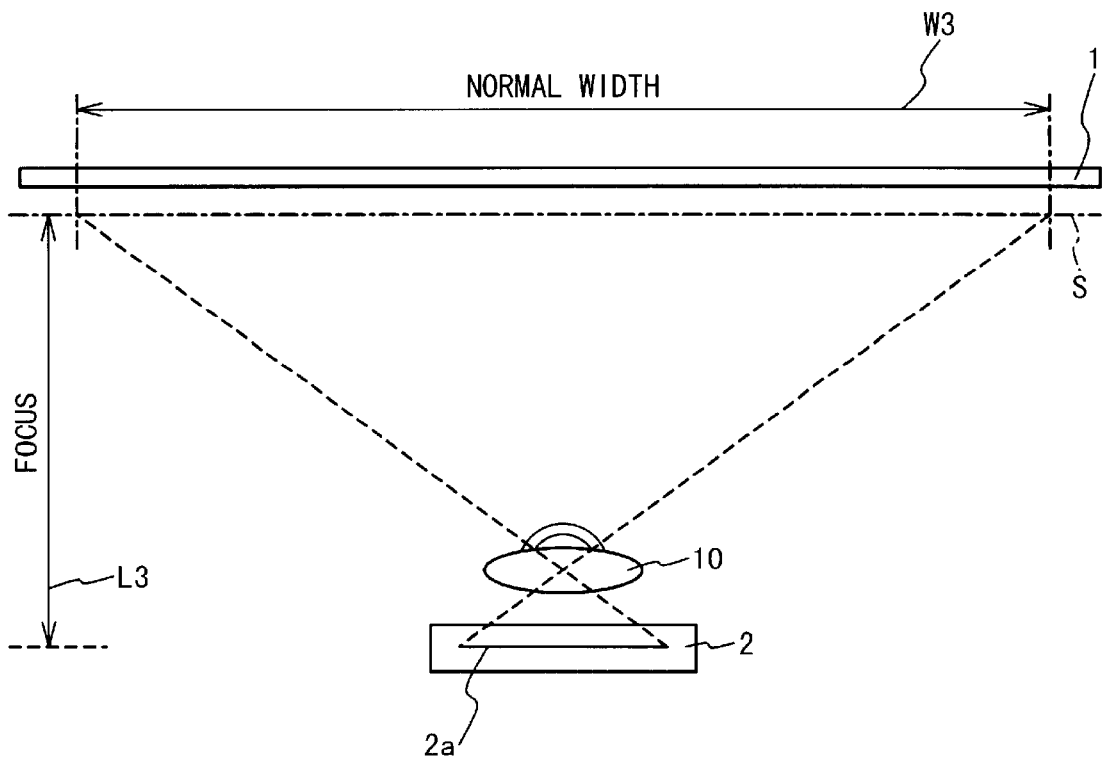
FIG. 4 is a schematic configuration view showing an embodiment of an image reader according to the present invention.

An embodiment of an image reader according to the present invention will be described below with reference to FIGS. 4 and 5. In FIG. 4, a symbol 1 denotes a light source. 2 denotes a reading device. 10 denotes an optical lens. S denotes a reading target in which a character and a picture are drawn on a front surface.

The light source 1 is arranged on a rear side (a surface where the character and the picture are not drawn) of the reading target S. Lights from the light source 1 are emitted onto the rear of the reading target S. The reading device 2 is arranged on a front side (a surface where the character and the picture are drawn) of the reading target S. Shadow of the character and the picture (an image) based on the light from the light source 1 is read by scanning. The optical lens 10 is arranged between the reading target S and the reading device 2. The optical lens 10 forms the image on an image forming surface 2a of the reading device 2. An image information inputted to the reading device 2 is converted into an electric signal. The reading device 2 is provided with a line memory (not shown) and an image processor (not shown). The reading device is, for example a CCD sensor and has a resolution characteristic of 1200 dpi. The electric signal is stored in the line memory. The image processor re-constitutes the image, in which distortion is small, in accordance with the stored electric signal.

The optical lens 10 has a distortion characteristic that a distortion rate of a central part of a lens positioned at a center in a scan direction of the reading device 2 is larger than a distortion rate of an end part of the optical lens 10. The end part of the optical lens 10 implies the vicinities of both ends in the scan direction. A lens having this characteristic is typically referred to as a wide-angle lens or a fish-eye lens. In the optical lens 10, a resolution of the central part is set to be higher than that of the end part. For example, if the resolution of the end part is 600 dpi, that of the central part is set to 1200 dpi.

Figure 1:
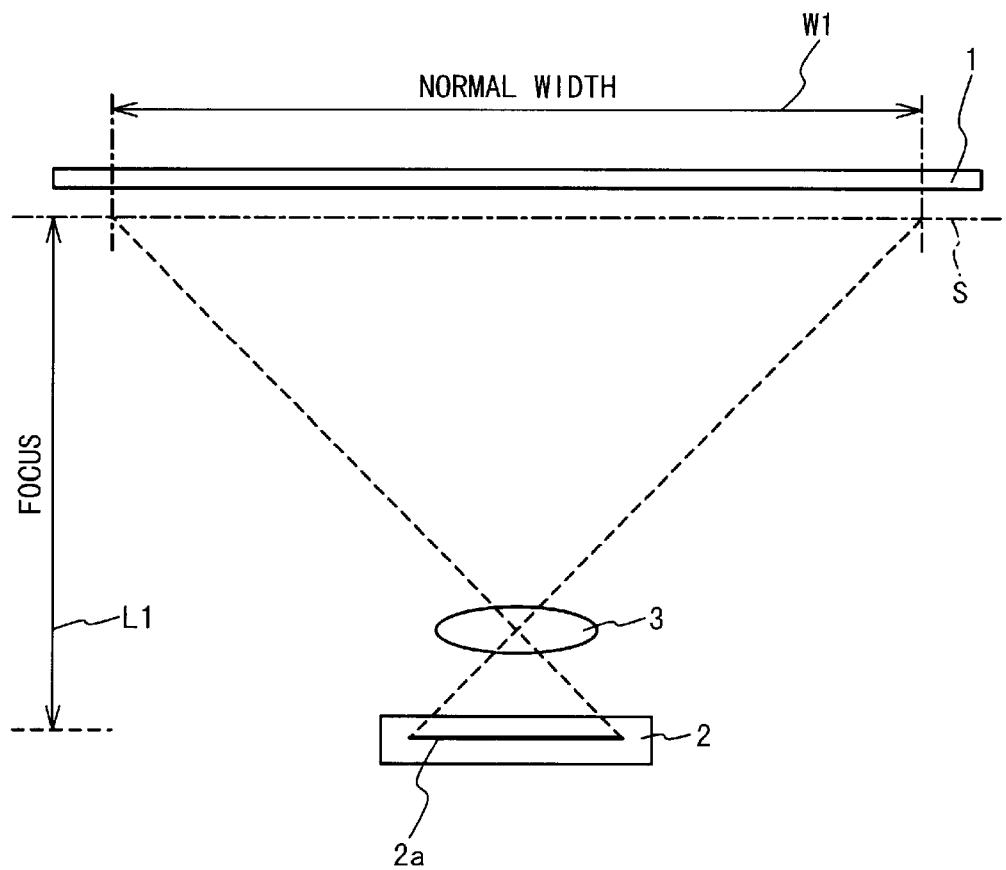
FIG. 1 is a schematic configuration view showing an example of a conventional image reader.
Figure 2:
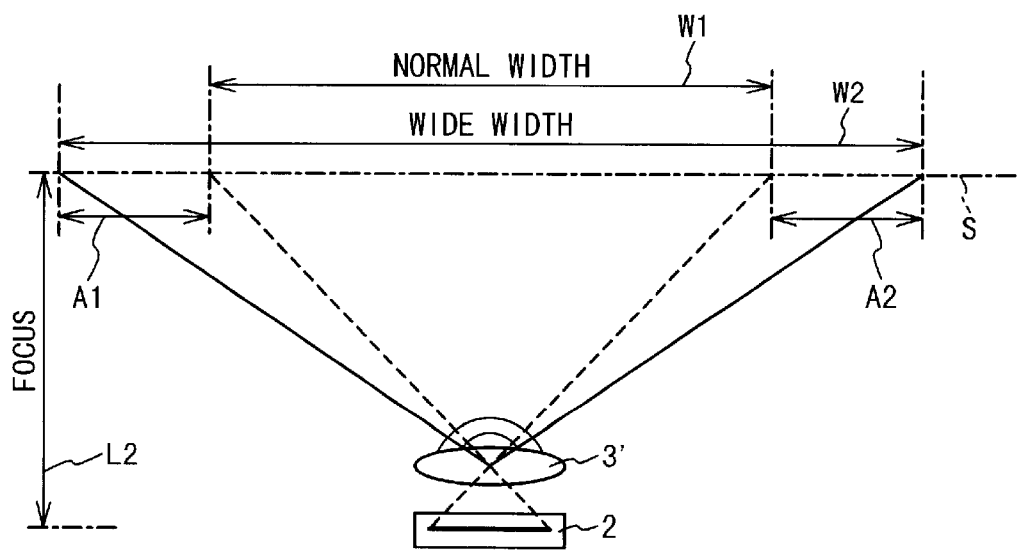
FIG. 2 is a state explanation view showing an effective reading width when a wide-angle lens is employed in a conventional image reader.
Figure 3:
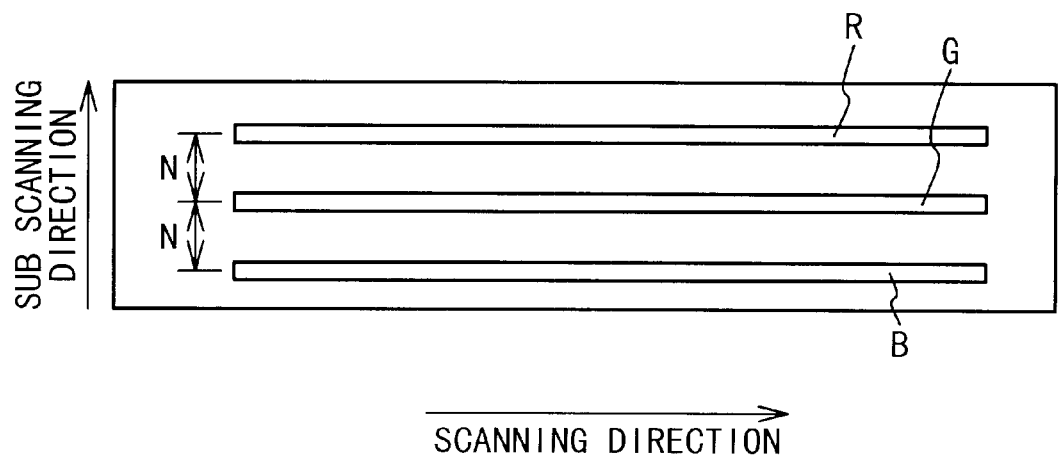
FIG. 3 is a schematic view showing an arrangement of each line of R, G and B in a color CCD mounted in the conventional image reader.

In the optical lens 10, the distortion rate of the end part is set to be larger, as shown in FIG. 2. This distortion characteristic enables the reading operation to an effective reading width to be carried out in an optical path (focal length) of a short length The focal length L3 is shorter than the focal length (L1: FIG. 1) and the focal length (L2: FIG. 2). The usage of the optical lens 10 enables the effective reading width having the same value as the conventional lens to be reserved even if the length of the optical path is made shorter. If the length of the optical path is made shorter, the device can be miniaturized.

The resolution of the central part in which the optical distortion is small is set to be higher than that of the end part. Due to this characteristic, the resolution of the end part in which the distortion rate is large is maintained at a desirable value, which avoids a drop of information. This characteristic enables the reading performance to be kept equal to or higher than a predetermined standard at any position with regard to the effective reading width. This characteristic cancels out the necessity of the process for compensating for the drop of the information.

As the distortion rate of the end part is larger, the formed image is gradually smaller from the central part to the end part. A consumption amount of memories per unit length of the effective reading width is reduced with approach to the end part. That is, the number of line memories used for storing the image can be reduced as compared with the case that a lens having a constant distortion rate is used. A capacity of the reduced line memories is shown by an equation (a desirable resolution of a device/a resolution of a central part of a lens)

Figure 5:
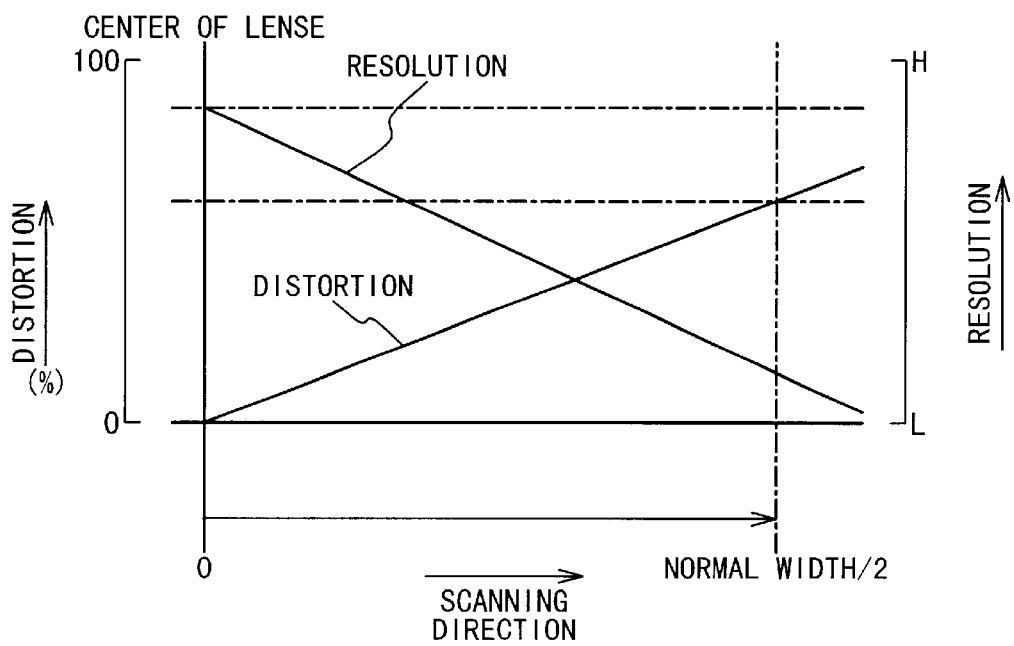
FIG. 5 is a graph showing optical characteristics given to an optical lens of FIG. 4.

FIG. 5 shows a resolution curve and a distortion curve in relation to the present invention. The resolution curve and the distortion curve in relation to the present invention are both represented by straight lines indicative of mere increase and decrease. Other than the optical lens 10 having this characteristic, an optical lens having a characteristic represented by a non-linear curve may be employed.

If an optical path is turned by a reflection mirror, the arrangement of the reading device can be changed. Due to this change, the whole length of the optical path is fixed to thereby enable a distance (focal length) between the reading target and the reading device to be shorter. In this case, a conventional hand scanner (or a handy scanner) can be miniaturized without using a contact type image sensor. Also, a manufacturing cost can be kept cheap.

In the image reader described in this embodiment, the light source 1 is mounted on the rear side of the reading target S. The present invention can be applied to the configuration in which the light source is mounted on the front side of the reading target S.

The image reader according to the present invention can correspond to any input of a color image input and a monochrome image input.

In the image reader of the present invention as mentioned above, the distortion rate of the end part is set to be larger than that of the central part in the scan direction in the optical lens. As for the resolution of the optical lens, the resolution of the central part is set such that a predetermined resolution is obtained in the end part. This setting enables the resolution of the end part to be kept and also enables the effective reading width of the image to be expanded. If the optical lens having this characteristic is used, it is possible to reserve the effective reading width equal to that of the conventional image reader, even if the length of the optical path is made shorter. The reduction of the length of the optical path enables the image reader to be miniaturized.

What is claimed is:

1. An image reader comprising:
   a light source irradiating light to a reading object;
   a reading device reading an image on said reading object based on reflected light from said reading object; and
   a lens focusing said image onto said reading device and having an optical characteristic in which a distortion rate is increased from a central part to an end part of said lens;
   wherein said distortion rate of said end part is set to a value in which a correction of said read image is not needed.

2. An image reader as claimed in claim 1,
   wherein said lens is provided by a wide-angle lens or a fish-eye lens.

3. An image reader as claimed in claim 1,
   wherein said light source is arranged in a rear side of said reading object,
   said reading device is arranged in a front side of said reading object, and
   said lens is arranged between said reading object and said reading device such that said image of said reading object is focused on said reading device.

4. An image reader as claimed in claim 1,
   wherein said light source and said reading device are arranged in a front side of said reading object and,
   said lens is arranged between said reading object and said reading device such that said image of said reading object is focused on said reading device.

5. An image reader as claimed in claim 1,
   wherein a resolution for said end part is set to 200 dpi and more, and
   a resolution for said central part is set to 300 dpi and more.

6. An image reader as claimed in claim 1,
   wherein the reading device comprises a line memory which stores an image data of the read image.

7. An image reader as claimed in claim 1,
   wherein the reading device comprises a CCD which can generate a signal based on the read image.

8. An image reader as claimed in claim 1 comprises:
   a mirror arranged on a light path between the reading object and the lens and reflecting the reflected light from the reading object to the lens.

9. An image reader as claimed in claim 1,
   wherein focus length of the lens is set such that a distance between the reading object and the reading device is set from 30 mm to 250 mm.

10. An image reader as claimed in claim 1,
    wherein resolution of the reading device is set to 200 dpi and more.

11. A method of image reading, comprising:
    irradiating a light from a light source to a reading object;
    focusing an image on said reading object to a reading device by a lens whose distortion rate increases from a central part of said lens to an end part thereof;
    wherein said distortion rate of said end part is set to a value in which a correction of said image read on said reading object is not needed.

12. A method of image reading as claimed in claim 11, wherein said lens is provided by a wide-angle lens or a fish-eye lens.

13. A method of image reading as claimed in claim 11, wherein said light source is arranged in a rear side of said reading object, said reading device is arranged in a front side of said reading object, and said lens is arranged between said reading object and said reading device such that said image of said reading object is focused on said reading device.

14. A method of image reading as claimed in claim 11, wherein said light source and said reading device are arranged in a front side of said reading object, said lens is arranged between said reading object and said reading device such that said image of said reading device is focused on said reading device.

15. A method of image reading as claimed in claim 11, wherein a resolution for said end part is set to 200 dpi and more, and a resolution for said central part is set to 300 dpi and more.

16. A method of image reading as claimed in claim 11, wherein the reading device comprises a line memory which stores an image data of the read image.

17. A method of image reading as claimed in claim 11, wherein the reading device comprises a CCD which can generate a signal based on the read image.

18. A method of image reading as claimed in claim 11 comprises:

a mirror arranged on a light path between the reading object and the lens and reflecting the reflected light from the reading object to the lens.

19. A method of image reading as claimed in claim 11, wherein focus length of the lens is set such that a distance between the reading object and the reading device is set to 30 mm to 250 mm.

20. A method of image reading as claimed in claim 11, wherein resolution of the reading device is set to 200 dpi and more.

* * * * *